United States Patent [19]

Ochiai et al.

[11] 4,107,244

[45] Aug. 15, 1978

[54] METHOD AND APPARATUS FOR REPAIRING DAMAGED SURFACE OF REFRACTORY LINED VESSEL

[75] Inventors: Tsunemi Ochiai; Teruyuki Nishitani, both of Himeji, Japan

[73] Assignee: Nippon Steel Corporation, Tokyo, Japan

[21] Appl. No.: 695,964

[22] Filed: Jun. 14, 1976

[30] Foreign Application Priority Data

Jun. 13, 1975 [JP] Japan .................................. 50-71695

[51] Int. Cl.² ............................................... F27D 1/16
[52] U.S. Cl. ........................................ 264/30; 73/627;
264/40.1; 343/5 R
[58] Field of Search ......................... 264/22, 30, 40.1;
73/67.7, 67.8 S; 343/5 R

[56] References Cited

U.S. PATENT DOCUMENTS

| | | | |
|---|---|---|---|
| 3,606,162 | 9/1971 | Lehmann | 118/7 X |
| 3,684,560 | 8/1972 | Birchard | 264/30 X |
| 3,901,073 | 8/1975 | Dent | 73/67.8 S |

*Primary Examiner*—Thomas P. Pavelko
*Attorney, Agent, or Firm*—Wenderoth, Lind & Ponack

[57] ABSTRACT

A method and apparatus for repairing lining which comprises transmitting microwaves modulated by an antenna inserted into the vessel to the surface of the heated refractory lining in the refractory lined vessel, detecting the reflected waves, detecting the difference between the reference surface of the refractory lining and the damaged surface from the phase difference of the microwaves, controlling the transfer of the refractory gunning nozzle inserted into the vessel with the use of the deviation signal, and making the lining repair in the hot atmosphere.

10 Claims, 8 Drawing Figures

METHOD AND APPARATUS FOR REPAIRING DAMAGED SURFACE OF REFRACTORY LINED VESSEL

BACKGROUND OF THE INVENTION

The present invention relates to a method and an apparatus for repairing the damaged surface of the refractory lining which comprises measuring the surface of the lining of the refractory lined vessel in a hot atmosphere and repairing the damaged surface of the refractory lining on the basis of the results of the measurement.

The refractory lined vessels referred to in this invention are ladles, torpedo cars, mixers, converters, electric furnaces, spare or additional refining furnaces, and the like which are used in the steel making.

These vessels are, as shown in FIG. 1, constructed in such a manner that the outer shell has a metal frame 1, and the inner peripheral surface is formed with a permanent lining 2 and a wear lining 3. The lining refractories to be used for the linings 2 and 3 are made of refractory mix or monolithic refractories.

The above-mentioned permanent lining 2 is also called the safety lining and, in the normal operation, is not exposed as the working surface and is not worn out.

Unlike to this permanent lining 2, the wear lining 3 is subjected to abrasion due to hot metal or molten steel together with corrosion caused by the reaction with the slag in the steel making operation, or erosion due to spalling, and is gradually worn out. When it reaches the condition as in the drawings by dotted line 3, the operation is stopped. The wear condition of the wear lining 3 varies depending on the kind of vessel, and operating conditions.

After the suspension of the operation, the vessel is sufficiently cleaned, and the remaining wear lining 3 is demolished and the new wear lining 3 is applied to complete the repair. The period from one repair until the next, i.e., the operating period greatly varies depending on whether or not an intermediate repair has been made. Generally, for example, with respect to the ladle, this period is 70 – 150 times; with the the torpedo car, it is 700 – 1500 times; and, with the converter, it is 500 – 1500 times.

The repair process varies with respect to the contents depending on the kind of vessel, but generally, the repair process is as follows: cooling → demolition of the remaining wear lining → new building of the wear lining. This vessel repair process will be explained by taking the converter (capacity 100 t) as an example which takes a relatively short work period. The cooling time is 50 – 60 hours, the demolition time of the remaining wear lining; 10 – 15 hours; the building of the new wear lining, 60 – 70 hours; and, miscellaneous work, 10 – 20 hours, with a total of 130 – 160 hours being required.

Also, prior to the operation of the vessel, after the repair of the furnace, the drying and temperature elevating operations are carried out, and therefore more time is required.

As explained in the foregoing, for the repair of the refractory lined vessel, it is inevitable that there will be a long unproductive period of time.

With a view to shortening the unproductive time and reduce the consumption of the refractory, gunning has lately been adopted as the repair technique in the hot atmosphere. This gunning repair method is mainly to repair the local damaged portion in the hot atmosphere, and refractory materials are normally used which are almost equal to or of a slightly higher class than said refractory.

With this repair, the local damaged portion which is considered to be the direct cause of the furnace repair is repaired, and the service life is extended. Moreover, the damage balance of the lining refractory is maintained, whereby the consumption of the refractory can be reduced.

However, this gunning repair has had problems in the following points.

Namely, in the repair method, the damaged portions are discovered by the visual (naked eye) observation of the operator. As a result, the damaged portions, other than those remakably damaged, tend to be overlooked in many cases. Thus, when the whole lining is damaged, it becomes difficult to make a comparison of the damaged portion of the lining with the reference lining surface, and the amount of damage cannot be grasped wholly. Therefore, the repair is forestalled, and also, materials beyond the necessity tend to be used which are the drawbacks of the gunning repair method.

Also, because repair is started from the time when the local damage has advanced too far, the yield of the repair materials becomes favorable but it is difficult to extend the service life greatly.

Also, since the gunning repair is performed at the operation time of the vessel, it is preferable to perform it in as short a time as possible so that it does not pose an obstacle to production. But, in the practical pattern of inspection of the inside of the furnace by visual observation, it is difficult to improve the accuracy of the repair.

As described in the foregoing, the conventional repair method of the lining refractory of the vessel was involved with the problems in the gunning repair which was partly used in case of the full surface repair of the ordinary lining refractory and also in the consumption of the refractory and the nonoperation time on account of the repair.

SUMMARY OF THE INVENTION

An object of the present invention is to provide a method of repairing the damaged surface of the lining of refractory lined vessel which comprises accurately assessing the damage to the refractory lining and the position in the hot atmosphere and repairing the local or whole damages efficiently.

Another object of the present invention is to provide a repairing method which comprises sufficiently eliminating the imbalance of the remaining refractory lining and greatly prolonging the service life of the refractory lined vessel.

Still another object of the present invention is to provide a repairing method of the damaged surface of the lining of the refractory lined vessel which comprises inserting a damaged portion detecting means and a repairing means into the furnace, performing the accurate, continuous measurement of the wear portion and repair thereof in short time, thus remarkably shortening the unproductive time of the refractory lined vessel.

Yet another object of the present invention is to provide an apparatus for repairing the damaged lining surface of the refractory lined vessel which is capable of performing the foregoing repair method effectively.

A method and apparatus for repairing the refractory lined vessel according to the present invention comprises transmitting microwaves modulated by an antenna inserted into the vessel to the surface of the heated refractory lining in the refractory lined vessel, detecting the reflected waves, detecting the difference between the reference surface of the refractory lining and the damaged surface from the phase difference of the microwaves, controlling the transfer of the refractory gunning nozzle inserted into the vessel with the use of the deviation signal, and making the lining repair in the hot atmosphere.

DESCRIPTION OF THE PREFERRED EMBODIMENT

Figure 1:
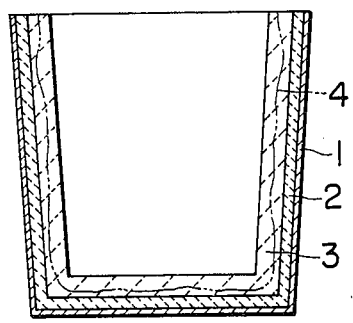
FIG. 1 is an explanatory cross section showing the summary of the ladle.

Hereinbelow, the present invention will be described more concretely by referring to the drawings.

Figure 2:
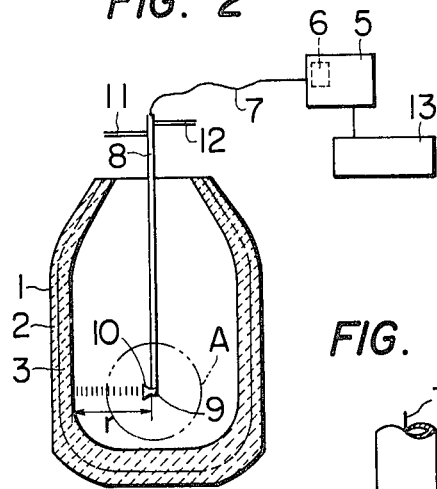
FIG. 2 is an explanatory drawing of the mode in which the prfile in the converter is measured according to the present invention.
Figure 3:
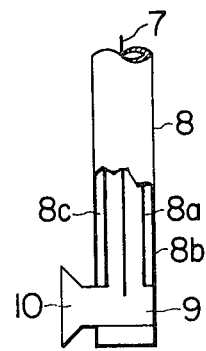
FIG. 3 is an explanatory cross section of the A portion of FIG. 2, part of which is enlarged.

In FIGS. 2 and 3, reference numeral 1 denotes an iron plate forming the outer shell of the converter, and on the inner periphery of the iron plate 1, a permanent lining 2 and wear lining 3 are applied as the lining. In the operation of this converter, after the molten steel and slag are discharged, the damaged condition of the wear lining 3 is measured. As the measuring method, various methods are available, but in the present invention, a non-contact type measuring device is employed.

In the illustration, the non-contact type measuring device is employed, and at a proper position outside the furnace, a profile measuring machine 5 is installed. In this measuring machine 5, a microwave transmitter 6 is built in. This transmitter 6 is connected with a flexible coaxial cable. The tip side of the cable 7 reaches a tip of a measuring rod 8 through the inside of the measuring rod 8. At the tip portion of the measuring rod 8, a transformer 9 is provided. At the opening side of the transformer 9, an antenna 10 is mounted.

In case a rectangular waveguide is employed in the flexible coaxial cable, a joint for connecting the rectangular waveguide and the circular waveguide is employed.

The foregoing rod 8 is inserted into the furnace which is not substantially cooled. Therefore, it is of a cooling structure and, for example, a feed water pipe 11 and a drain pipe 12 are provided to water cool the entire furnace.

Namely, the measuring rod 8 is of a double tube structure consisting of an inner tube 8a and an outer tube 8b, and the cooling water flows in the space 8c formed between both pipes. It provides effectiveness if the outer periphery of the outer tube 8b is lined with the castable refractory material.

The measuring rod 8 is disposed at a reference position set in the furnace.

Figure 4:
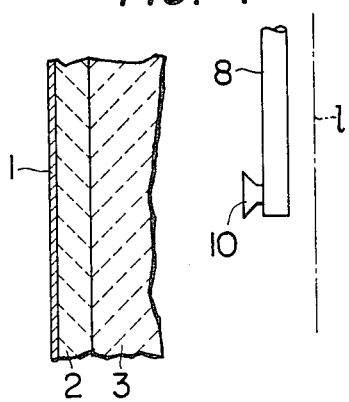
FIG. 4 is an explanatory drawing of the mode in which an antenna is disposed on an axis line in parallel with an axis line of the vessel the profile measurement of the lining surface according to the present invention.

In this case, the axis line of the vessel or the line parallel with the axis line may be made as the reference position. Also, in case the measuring rod 8 cannot be positioned on the axis line $l$ of the vessel due to the obstacle of an accessory unit disposed inside the vessel, the axis line of the measuring rod 8 may be offset from the axis line $l$ as shown in FIG. 4 whereby the measuring rod 8 can be inserted. In this case, the reference position becomes the rotary surface with the axis line $l$ of the vessel being the center axis.

In this condition, when the microwaves are transmitted from the microwave transmitter 6 to the transformer through the cable 7 and are converted to the rectangular form from the coaxial, and are emitted from the antenna 10. The emitted microwaves are reflected on the surface of the wear lining 3, are returned to the antenna 10, and enter the profile measuring machine after passing through the inverse route, and are separated by the circulator (not shown) and enter the reception unit.

The distance $r$ from the reference position to the surface of the wear lining 3 is obtained by detecting the phase difference between the transmission wave and reception wave, and is stored in the memory operation circuit 13 together with the signal of the position. The signals and the set profile (measured distance $r_o$ of new wear lining 3) are compared and the difference (damage amount) is displayed.

When the total surface of the periphery of the furnace is measured by rotating the measuring rod 8 according to the foregoing system, the refractory damage thickness of the whole periphery of the horizontal cross section of the furnace can be obtained. Moreover, when the measuring rod 8 is moved vertically along the center axis of the furnace, the profile of the whole periphery of the furnace and the damage thickness can be obtained.

The antenna moves according to the movement of the measuring rod, but the antenna may be moved in such a way that the rotation around the axis line of the vessel or the line in parallel with the axis and the transfer of a fixed distance along the line parallel with the axis are made alternately. Also, the antenna may be shifted continuously along the axis line of the vessel or the spiral with the line in parallel with the axis line as the center.

Figure 5:
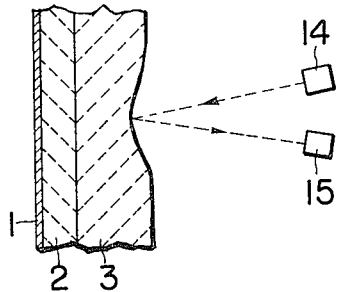
FIG. 5 is an explanatory drawing of the mode in which an antenna for transmission and an antenna for reception are used in the measurement of the profile of the lining surface of the present invention.

By the way, the antenna 10 serves for both transmission and reception but as shown in FIG. 5, it may be divided into an antenna 14 for transmission and an antenna 15 for reception.

In the normal operation the damage amount of the wear lining 3 of the vessel for the converter varies depending on the positions, and assuming that the operating conditions are same, the damage positions are almost constant. However, it is possible to perform the measurement control of the specific position concentrically according to the measuring system.

As the other mode of the non-contact type measurement, it is possible to use the laser.

In case the laser is employed, similar to the case where the microwaves are employed, it can be performed by applying the modulation with a polarization modulator.

The non-contact type measurement is particularly effective when the profile of the vessel whose damage of the wear lining 3 extends over relatively wide range or the profile of a large size vessel is measured. Next, with respect to the repair of the damaged surface of the refractory lining which is worn out, an explanation will be provided by referring to FIG. 6.

In the drawing, the measurement of the damage condition of the wear lining 3 can be made by a unit similar to the noncontact type measuring unit employing the microwaves described in connection with FIGS. 2 and 3. Therefore, an explanation is omitted herein.

In the drawing, reference numeral 13 denotes a memory operation circuit, and in this circuit 13, the measured profile $r$ and the reference profile $r_o$ are compared, and the difference (damage amount) is stored together with the signal of position. When the difference (damage amount) exceeds the repair reference, the signal is impressed to the controller 19 of the hot repairing apparatus, and the hot repairing apparatus starts the operation. As the hot repairing apparatus, it is possible to use the publicly known unit such as gunning device. Now, one example is displayed, in which the gunning mix 21 stored in the tank 20 is fed or not fed as the electromagnetic valve 22 is operated by the signal of the controller 19. Together with the foregoing operation, the electromagnetic valve 24 of the supply pipe 23 of the water for mixing is operated. The mix 21 and water are mixed while passing the lance to become the slurry, which is ejected from the nozzle 26 of the lance 25.

Figure 7:
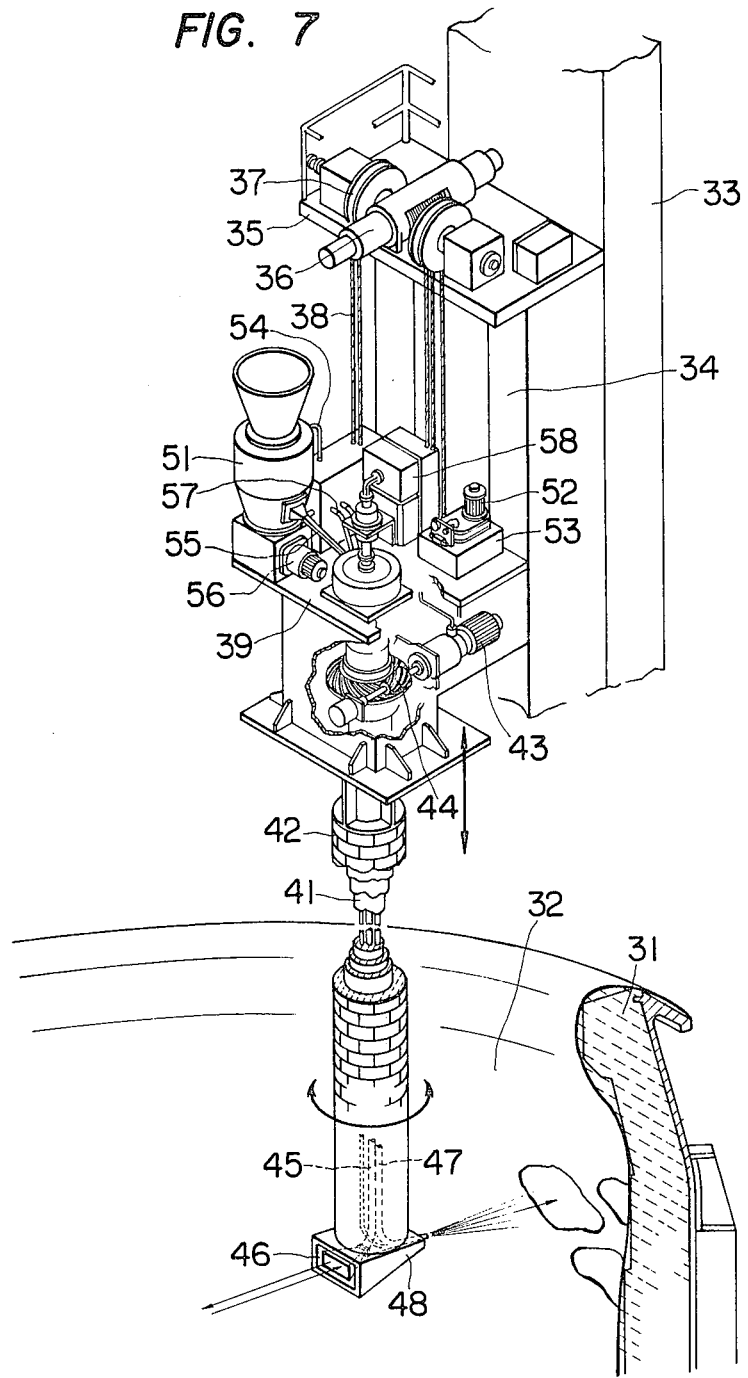
FIG. 7 is a perspective view showing the details of the apparatus of the present invention.

Accordingly, when the lance 25 is disposed parallel to the measuring rod 8, the repair can be performed after the measurement of the damaged portion. FIG. 7 is a perspective view showing a concrete example of the apparatus of the present invention.

A bracket 35 is fixed to a frame 33 extending perpendicularly, and the bracket 35 is rotatably mounted with a wire drum 37 which is rotatably driven by a pulse motor 36.

On the frame 33 is a lifting table 39 that lifts by being guided by a guide surface 34 as it is suspended by a wire 38 from a wire drum 37. The wire drum 37 takes up the wire 38 or rewinds by the drive of the pulse motor 36 and the lifting table 39 ascends or descends.

On the lifting table 39, a measuring rod 41 extending in the downward direction and being covered with the mix 42 is rotatably mounted. The measuring rod 41 is rotatably driven by the pulse motor 43 fixed on the lifting table 39 by means of a gear transmission mechanism 44. In the measuring rod 41, the microwave waveguide 45 and the repair material transport pipe 47 are built in along the axis of the measuring rod 41. The microwave guide 45 is connected to the microwave antenna 46 that is directed to the lining surface 32 of the vessel 31 at the lower end of the measuring rod 41. Also, the repair material transport pipe 47 is mounted at the lower end of the measuring rod 41 with back-to-back relation with the antenna 46, and is connected to the gunning nozzle 48 directed to the lining surface 32.

Furthermore, on the lifting table 39, the repair material vessel 51 is fixed, and a compressed air pipe 54 from a compressor 53 driven by a motor 52 is connected in the vicinity of the top portion of the repair material vessel 51. On the other hand, the lower part of the repair material vessel 51 is connected to the top portion of the repair material transport pipe 47 by means of the repair material supply pipe 55. The repair material in the repair material vessel 51 is pressure fed to the repair material transport pipe 47 by the compressed air according to the operation of the supply device (not shown) driven by the motor 56. By the way, in the repair material transport pipe 47, the water is supplied from the feed water pipe 57 connected to the middle of the transport pipe 47, and the repair material and water are mixed in the repair material transport pipe 47.

Furthermore, on the lifting table 39, a profile measuring unit 58 is mounted. The profile measuring unit 58 outputs the microwaves to the antenna 46 through the microwave waveguide 45, and also inputs the microwaves received by the antenna 46 as the waves are reflected by the lining surface 32.

Figure 6:
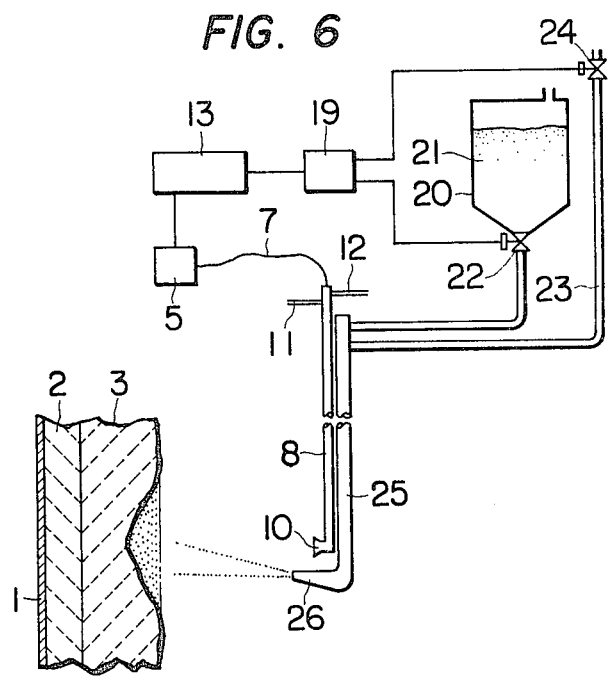
FIG. 6 is an explanatory drawing of the mode in which the profile of the lining surface is measured according to the present invention and the hot gunning device is operated by the signal.

By the way, in this apparatus of the concrete example, the antenna 46 and the gunning nozzle 48 are mounted at the lower end of the measuring rod 41 in back-to-back relation, but as shown in FIG. 6, the antenna 10 and the gunning nozzle 26 may be arranged so as to be in the same direction by being slightly vertically offset.

Next, by referring to FIG. 8, the method of treating the measuring signal of the apparatus according to the present invention and the control method of the repairing device will be described.

In the profile measuring machine, the microwaves of, for example, 10.5 GHz generated by a microwave generator 60 are transmitted to a coupler 63 by means of an isolator 64. The microwaves from the coupler 63 are transmitted to a transformer 65 by means of the isolator 64, and are modulated by the microwaves of, for example, 200 MHz generated by a modulated wave oscillator 66.

The modulated microwaves are transmitted to the antenna 46 through a circulator 67 and a matching unit 68. The microwaves transmitted from the antenna 46 are reflected by the lining surface 32 as mentioned in the foregoing, and enter the antenna 46 again. The microwaves received by the antenna 46 are transmitted to a mixer 70 through the matching unit 68, circulator 67 and isolator 69.

On the other hand, the microwaves from the coupler 63 are transmitted to a microwave transformer 65 and are modulated by an intermediate frequency oscillator 72. The modulated waves from the microwave modulator 71 are transmitted to the mixer 70 and the waves are mixed with the microwaves from the isolator 69. And the mixed microwaves are transmitted to a phase detector 74 by means of the intermediate frequency amplifier 73.

The transmission signal from the intermediate frequency oscillator 72 is inputted to the phase detector 74, and the phase of the transmission signal and the phase of the reflecting waves from the intermediate frequency amplifier 72, namely, from the lining surface are compared. The distance from the reference position to the lining surface 32 is detected from the phase difference of both signals.

The signal from the phase detector 74 is transmitted to a signal processing unit 75. On the other hand, the reference signal of a reference profile setting unit 76 is inputted to the signal processing unit 75. The reference signal represents the distance between the reference position and the reference profile surface. In the signal processing unit, the signal from the phase detector 74 and the signal from the reference profile setting unit 76 are compared and the damage amount of the lining is detected.

The position and indicating direction of the antenna 46 in the vessel 31 are determined by the position of the measuring rod 41 to be driven by the pulse motors 36 and 43. Reference is made to FIG. 7. Accordingly, the position and indicating direction of the antenna 46 can be detected by counting the pulses to be applied to the pulse motors 36 and 43.

Figure 8:
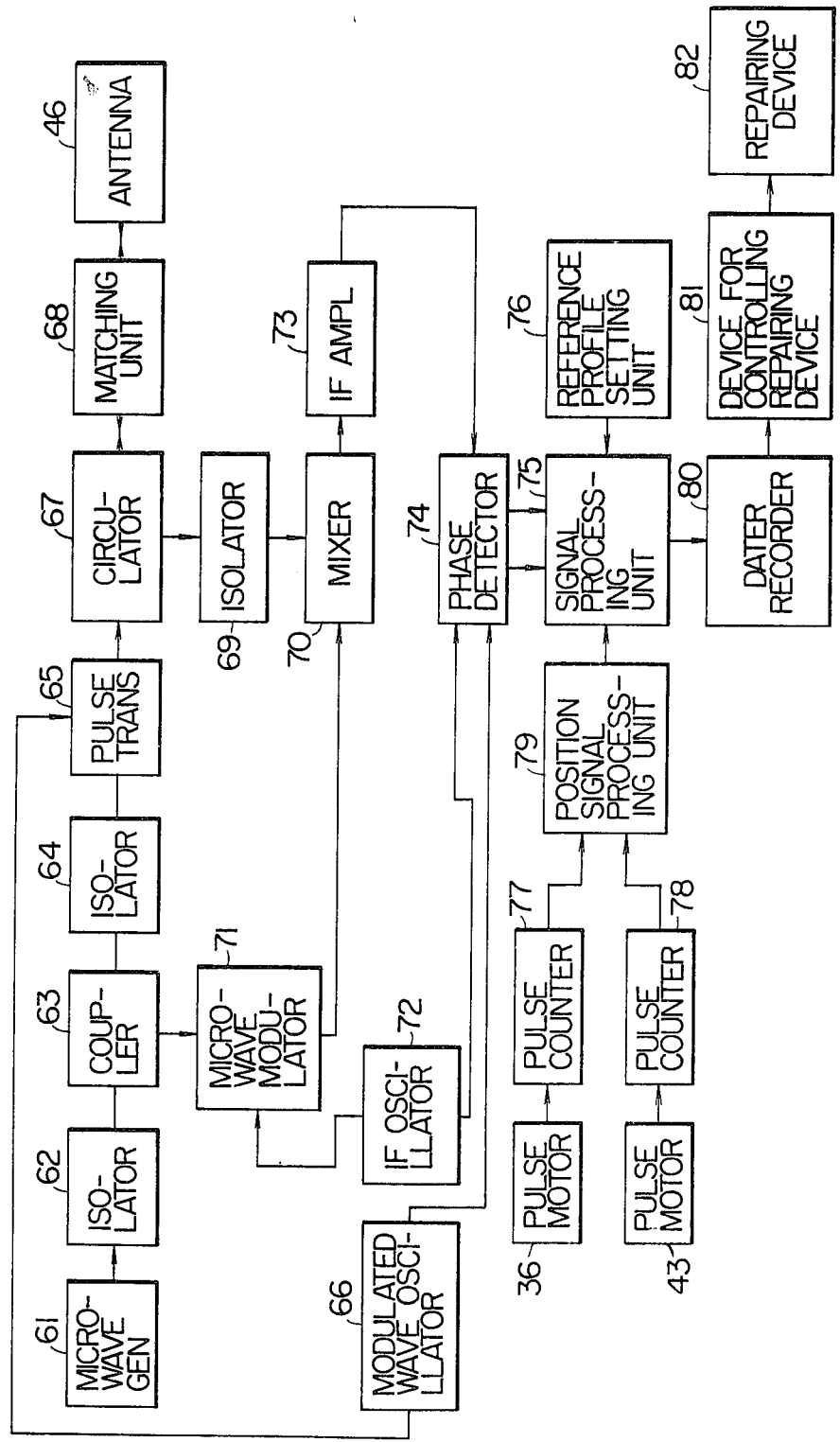
FIG. 8 is a diagram explaining the control of the measuring and repairing devices by the apparatus of the present invention.

In FIG. 8, the pulses to be applied to the pulse motors 36 and 43 are counted by pulse counters 77 and 78 and are inputted to a position signal processing unit 79. Thus, the position of the lining surface 32 which is directed by the antenna 46 is detected. The position signal from the position signal processing unit 79 is inputted to the signal processing unit 75 and abut with the signals from the phase detector 74, and the position of the lining surface 32 and the damage amount at the position correspond.

The signal showing the position of the lining surface 32 from the signal processing unit 75 and the damage amount at the position is stored in a data recorder 80.

The measurement of the profile of the lining surface and the repair of the damaged portion are separately carried out. For example, when the measuring rod 41 descends, the profile of the lining surface is measured and when it is lifted, it is repaired. Namely, when the measuring rod 41 is lifted to cause the gunning nozzle 48 to scan the lining surface, the signal is transmitted from the data recorder 80 to a device 81 for controlling the repair device, and the control device 81 stops the gunning nozzle at the position for a time according to the damage amount of the portion when the gunning nozzle directs the damaged portion, and spraying the gunning mix so as to repair the damaged portion. By the way, in case the gunning mix is sprayed, it is possible to fill and repair by changing the supply amount of the gunning mix according to the damage amount of the damaged portion per unit time.

Also, as the reference lining surface, the original lining surface of the vessel which has not been used is employed, but in lieu thereof, the surface which is uniformly damaged at the number of times of use of the refractory lining may be employed as the reference surface.

EMBODIMENT 1.

Subject vessel: Oxygen top-blown converter (capacity 100 $t$)

Profile measurement: Microwave system (non-contact type)

The microwaves of 10.5 GHz were modulated with 300 MHz, and the measurement was effected with the phase difference of the transmission and reception waves.

Accuracy of measurement: 5 – 10 mm. (By the way, the measuring accuracy at the local portion by the naked-eye observation is about 30 mm.)

Method of repairing: Dry type gunning repairing method (the mix was kneaded with water in the repair material transport pipe).

Material . . . magnesia
Gunning amount . . . 500 – 1500 kg/time
Frequency of repair . . . 1 time/2 – 5 charges The profile measurement and the repair were continuously and instantly carried out.

The effects as shown in Table 1 are obtained when the operation was carried out in the foregoing conditions.

Table 1

| Item | | Conventional method | | Method of present invention |
|---|---|---|---|---|
| | | without repair | gunning repair | |
| Furnace life charge/campaign | | 650 | 1050 | 1600 |
| refractories consumption (Kg/t steel) | brick | 3.2 | 2.2 | 1.3 |
| | gunning mix | 0.3 | 1.0 | 1.5 |
| | overall (brick + gunning mix) | 3.5 | 3.2 | 2.8 |
| refractories original cost index | | 100 | 86 | 70 |
| Total non-operation hour due to repair | | 0 | 100 | 30 |

EMBODIMENT 2

Subject vessel: Torpedo car (capacity 300 t)
Profile measurement: Microwave system (non-contact type)

Microwaves of 10.5 GHz were modulated with 200 MHz and the measurement was effected by the phase difference of the transmission and reception.

Accuracy of measuring unit: 5 – 10 mm. (By the way, the naked-eye observation was not possible in the hot atmosphere.)

Method of repairing: Wet type gunning repairing method

Material . . . high alumina
Gunning amount . . . 300 – 500 kg/time
Frequency of repair . . . 1 time/30 – 100 charges after more than 500 charges The operation was carried out in the foregoing conditions and the effects as shown in Table 2 are obtained.

Table 2

| Item | | Conventional method | Method of present invention |
|---|---|---|---|
| Furnace life charge/campaign | | 800 | 1300 |
| refractories consumption (kg/t steel) | brick | 0.31 | 0.17 |
| | gunning mix | 0.11 | 0.16 |
| | overall | 0.42 | 0.35 |
| refractories original cost index | | 100 | 80 |

The repair by conventional method was made by the naked-eye observation and repair after cooling.

As described in the foregoing, according to the present invention, whole or part of the profile of the wear lining surface is directly measured by employing a measuring unit of a contact or non-contact type at the time of operation of the refractory lined vessel. Therefore the lining damage amount and the positions can be accurately grasped. Also, the repair of the vessel can be carried out according to program by the data relating to the lining damage.

Also, the damage amount is grasped by comparing the used surface profile and the reference (new lining) profile by employing the measuring unit, and therefore not only the local damage but also the whole damage can be grasped.

Also, the repairing device is operated by the signals of the lining profile measured data, and as a result, proper repair can be made to the local or whole damage, and the imbalance of the remaining lining can be eliminated and the service life of the refractory lined vessel can be greatly prolonged.

Furthermore, the measurement and repair can be accurately carried out continuously in a short time so that the nonproduction time of the refractory lined vessel can be shortened.

What is claimed is:

1. In a method of repairing a damaged portion of the lining of a refractory lined vessel which comprises setting a reference position in the space of a vessel whose heated refractory lining is not substantially cooled, inserting an antenna and monolithic refractory nozzle into the vessel which are directed to the lining surface, causing microwaves transmitted from the antenna to reflect with the lining surface while shifting the antenna, receiving the microwaves, measuring the distance between each position on the lining surface and the reference position from the phase difference between the transmitted waves and received waves, comparatively operating the distance and a distance between the reference lining surface and the reference position, taking out deviations of each position as electric signals, controlling the transfer of the nozzle by employing the deviation signals, gunning the monolithic refractory to the deviated portion which needs repair and repairing the refractory lining.

2. In the method as defined in claim 1 in which an axis line of the vessel or a line in parallel with the axis line is made the reference position.

3. In the method as defined in claim 1 in which a rotary surface using the axis line of the vessel as the center axis is made the reference position.

4. In the method as defined in claim 1 in which the antenna and gunning nozzle are made to rotate with the axis line of the vessel or the line in parallel with the axis line as the center, and are shifted for a fixed distance along the axis line of the vessel or a line in parallel with the axis line.

5. In the method as defined in claim 1 in which the antenna and the gunning nozzle are continuously shifted along the axis line of the vessel or a spiral with the line in parallel with the axis line as the center axis.

6. In the method as defined in claim 1 in which as the reference lining surface, the original lining surface of the vessel which has not been used is used.

7. In the method as defined in claim 1 in which the reference lining surface of the vessel is the surface which is uniformly damaged at the frequency of use of the refractory lining.

8. In the method as defined in claim 1 in which a measuring rod is inserted into the vessel and the profile measurement is carried out at the descending time of the measuring rod, and the repair is made when the measuring rod ascends.

9. In the method as defined in claim 1 in which the gunning nozzle is stopped for a time corresponding to the damage amount of the damaged portion and the gunning mix is applied to the damaged portion to repair the portion.

10. In the method as defined in claim 1 in which the supply amount of the gunning mix according to the damage amount of the damaged portion per unit time is changed and the gunning mix is applied to the damaged portion to repair it.

* * * * *